US012646663B2

(12) United States Patent
Kimishima

(10) Patent No.: US 12,646,663 B2
(45) Date of Patent: Jun. 2, 2026

(54) HANDLE LOCK DEVICE FOR CIRCUIT BREAKER

(71) Applicant: FUJI ELECTRIC FA COMPONENTS & SYSTEMS CO., LTD., Konosu (JP)

(72) Inventor: Yoshiyuki Kimishima, Kounosu-city (JP)

(73) Assignee: FUJI ELECTRIC FA COMPONENTS & SYSTEMS CO., LTD., Konosu (JP)

( * ) Notice: Subject to any disclaimer, the term of this patent is extended or adjusted under 35 U.S.C. 154(b) by 231 days.

(21) Appl. No.: 18/521,146

(22) Filed: Nov. 28, 2023

(65) Prior Publication Data

US 2024/0234044 A1 Jul. 11, 2024

(30) Foreign Application Priority Data

Jan. 11, 2023 (JP) ................................ 2023-002683

(51) Int. Cl.
*H01H 9/20* (2006.01)
*H01H 23/12* (2006.01)

(52) U.S. Cl.
CPC .............. *H01H 9/20* (2013.01); *H01H 23/12* (2013.01)

(58) Field of Classification Search
CPC .... H01H 9/20; H01H 23/12; H01H 2300/018; H01H 27/007; H01H 3/163; H01H 3/20; H01H 71/04; H01H 71/018; H01H 71/505; H01H 71/56; H01H 9/04; H01H 9/22; H01H 9/26; H01H 9/28; H01H 9/281; H01H 9/287; H01H 9/283; H01H 9/282; H01H 9/286; E05B 13/002; E05B 67/383
USPC .......................................................... 200/339
See application file for complete search history.

(56) References Cited

U.S. PATENT DOCUMENTS

| | | | | |
|---|---|---|---|---|
| 4,978,816 | A | 12/1990 | Castonguay et al. | |
| 5,905,236 | A * | 5/1999 | Green .................... | H01H 9/283 200/43.14 |

FOREIGN PATENT DOCUMENTS

| | | | |
|---|---|---|---|
| JP | 05-166451 | A | 7/1993 |
| JP | 2015-043264 | A | 3/2015 |

OTHER PUBLICATIONS

Japanese Office Action issued in corresponding Japanese Application No. 2023-002683 dated Feb. 3, 2026.

* cited by examiner

*Primary Examiner* — Anthony R Jimenez

(57) ABSTRACT

A handle lock device for a circuit breaker, the handle lock device including: a lock base attached to the upper surface of the case; a first lock hole division portion formed at a part of the lock base; a handle lock plate rotatably connected to the lock base; and a second lock hole division portion formed at a part of the handle lock plate, wherein when the handle lock plate rotates to a position that restrains the knob portion in the OFF position, the second lock hole division portion moves to a position continuous to the first lock hole division portion to form a lock hole, and a padlock is applied to the lock hole to cause the handle lock plate to restrain the knob portion in the OFF position.

7 Claims, 10 Drawing Sheets

HANDLE LOCK DEVICE FOR CIRCUIT BREAKER

CROSS REFERENCE TO RELATED APPLICATIONS AND INCORPORATION BY REFERENCE

This application claims benefit of priority under 35 USC 119 based on Japanese Patent Application No. 2023-002683 filed on Jan. 11, 2023, the entire contents of which are incorporated by reference herein.

TECHNICAL FIELD

The present disclosure relates to handle lock devices for circuit breakers, the handle lock devices being applied as external accessory devices for wiring circuit breakers, earth leakage circuit breakers, and the like.

BACKGROUND ART

To prevent an open/close operation handle of a circuit breaker installed in a switchboard from being accidentally turned from an OFF position (a position where a main circuit contact is open) to an ON position (a position where the main circuit contact is closed), there are increased need and demand for handle lock devices that lock a knob portion of a rocker type open/close operation handle into an OFF position.

As conventional handle lock devices, devices are known in which a locking member locks the knob portion of an open/close operation handle into the OFF position when padlocked (e.g., JP 2015-043264 A).

SUMMARY OF INVENTION

Technical Problem

However, in the conventional handle lock devices, a lock hole for padlocking is formed in a frame member or the locking member and the frame member, and a padlock may be applied to the lock hole even when the knob portion of the handle is in the ON position. This is problematic in terms of work safety.

Accordingly, it is an object of the present disclosure to provide a handle lock device for a circuit breaker that allows padlocking only when the knob portion of a handle is restrained in an OFF position and thereby enables enhanced work safety.

Solution to Problem

In order to achieve the above-described object, according to an aspect of the present disclosure, there is provided a handle lock device for a circuit breaker, the handle lock device being configured to lock a knob portion of a rocker type open/close operation handle protruding from an upper surface of a case of the circuit breaker into an OFF position, the handle lock device including: a lock base attached to the upper surface of the case; a first lock hole division portion formed at a part of the lock base; a handle lock plate rotatably connected to the lock base; and a second lock hole division portion formed at a part of the handle lock plate, wherein when the handle lock plate rotates to a position that restrains the knob portion in the OFF position, the second lock hole division portion moves to a position continuous to the first lock hole division portion to form a lock hole, and a padlock is applied to the lock hole to cause the handle lock plate to restrain the knob portion in the OFF position.

Advantageous Effects of Invention

According to the handle lock device of a circuit breaker of the present disclosure, it is possible to allow padlocking only when the knob portion of a handle is restrained in an OFF position and thereby enables enhanced work safety.

DESCRIPTION OF EMBODIMENTS

Embodiments of the present disclosure will now be described with reference to the attached drawings. Throughout the drawings, identical or similar members are labeled with the same or similar signs. It should be noted, however, that the drawings are schematic, and the relationship between a thickness and a planar dimension, the ratio in thickness between layers, and the like are different from real ones. Thus, concrete thicknesses and dimensions should be judged in consideration of descriptions below. Needless to say, the drawings include members with mutually different relations or ratios of dimensions.

In addition, embodiments described below illustrate, by way of example, a device or a method for embodying technical concepts of the present invention, and the technical concepts of the present invention do not specifically limit the material, shape, structure, arrangement, and the like of a component to those described below. Various changes may be made to the technical concepts of the present invention within the technical scope defined by the claims set forth in the appended claims.

Figure 1:
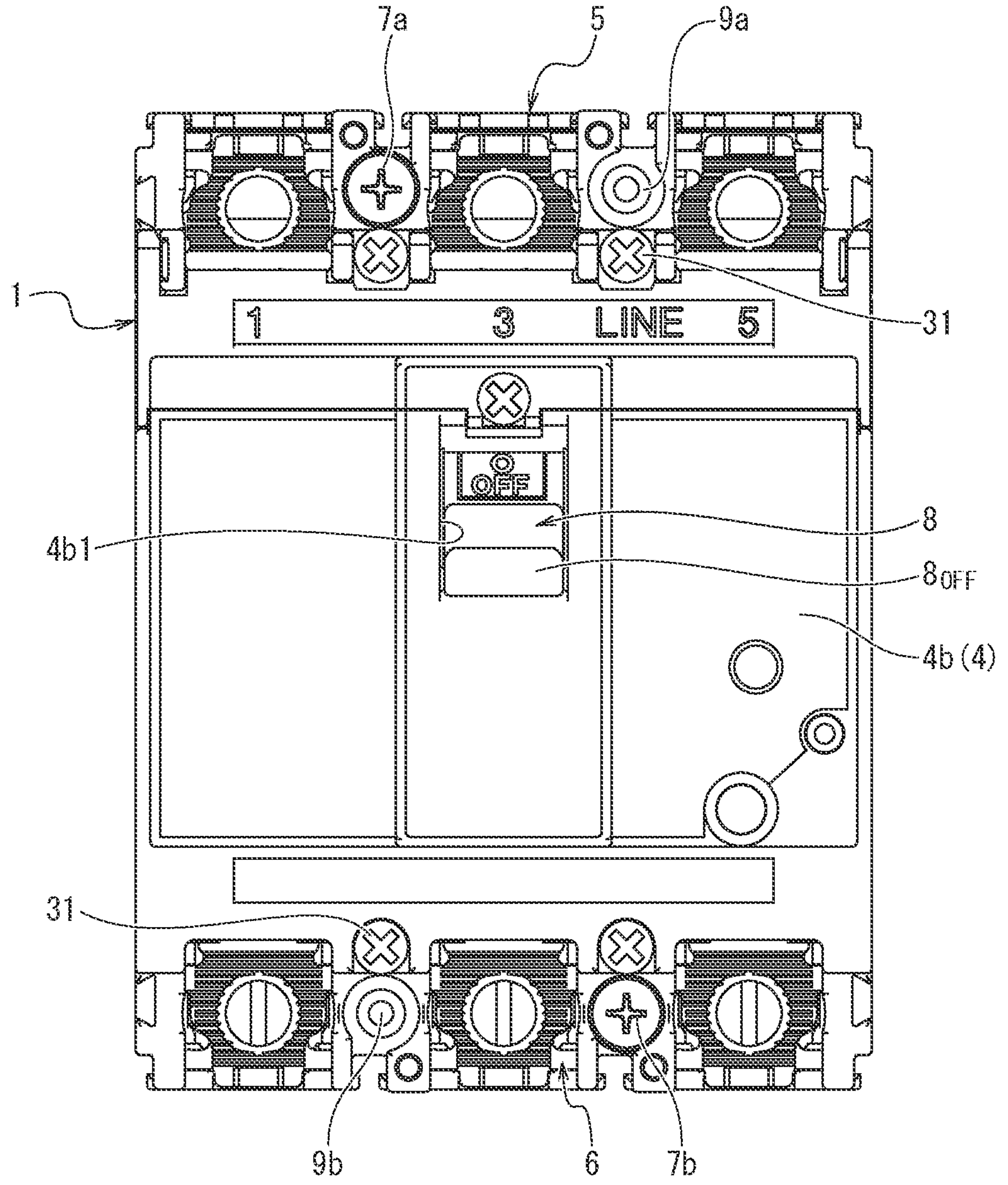
FIG. 1 is a plan view illustrating a circuit breaker according to the present disclosure.
Figure 2:
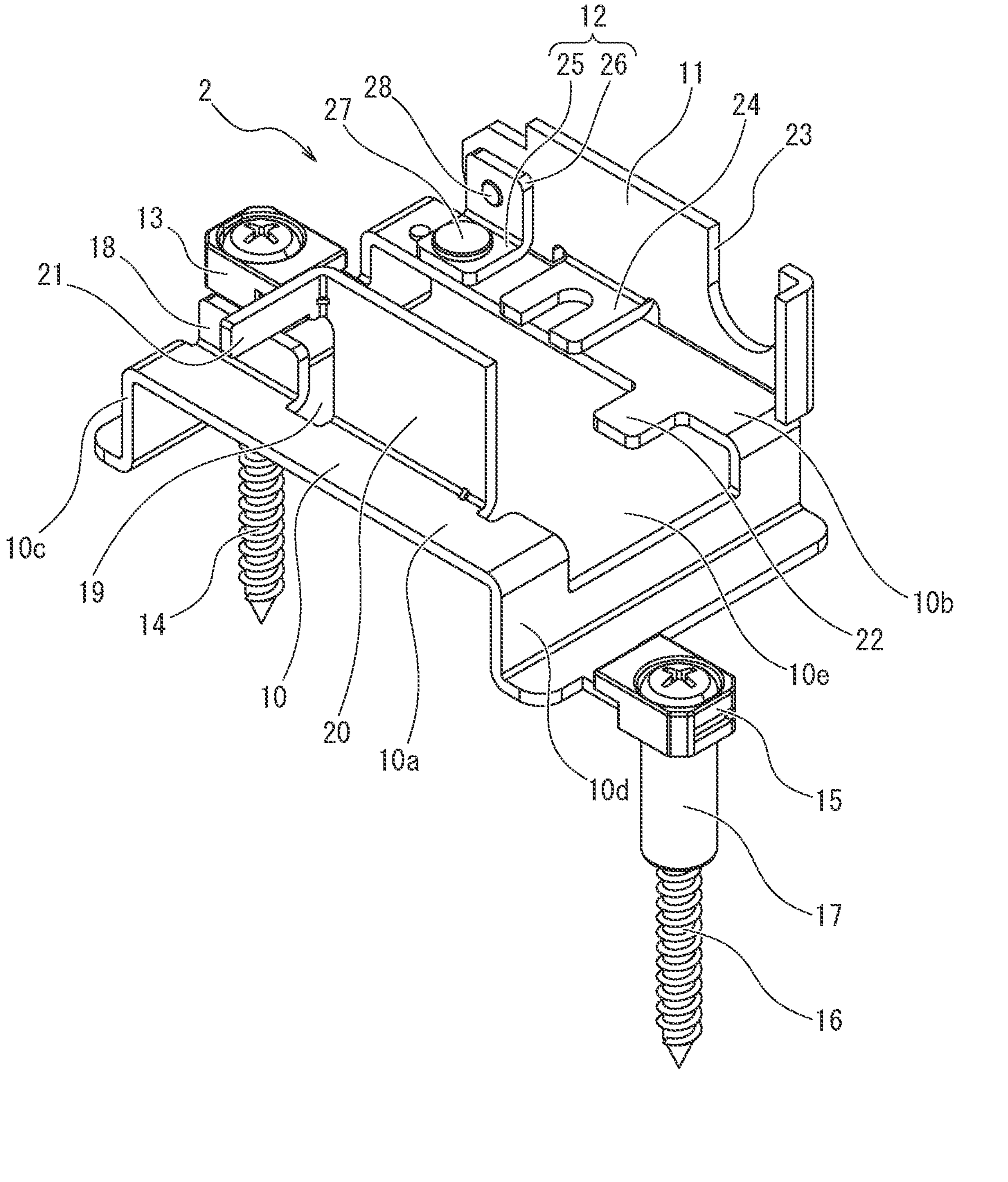
FIG. 2 is a perspective view illustrating a handle lock device according to the present disclosure.
Figure 3:
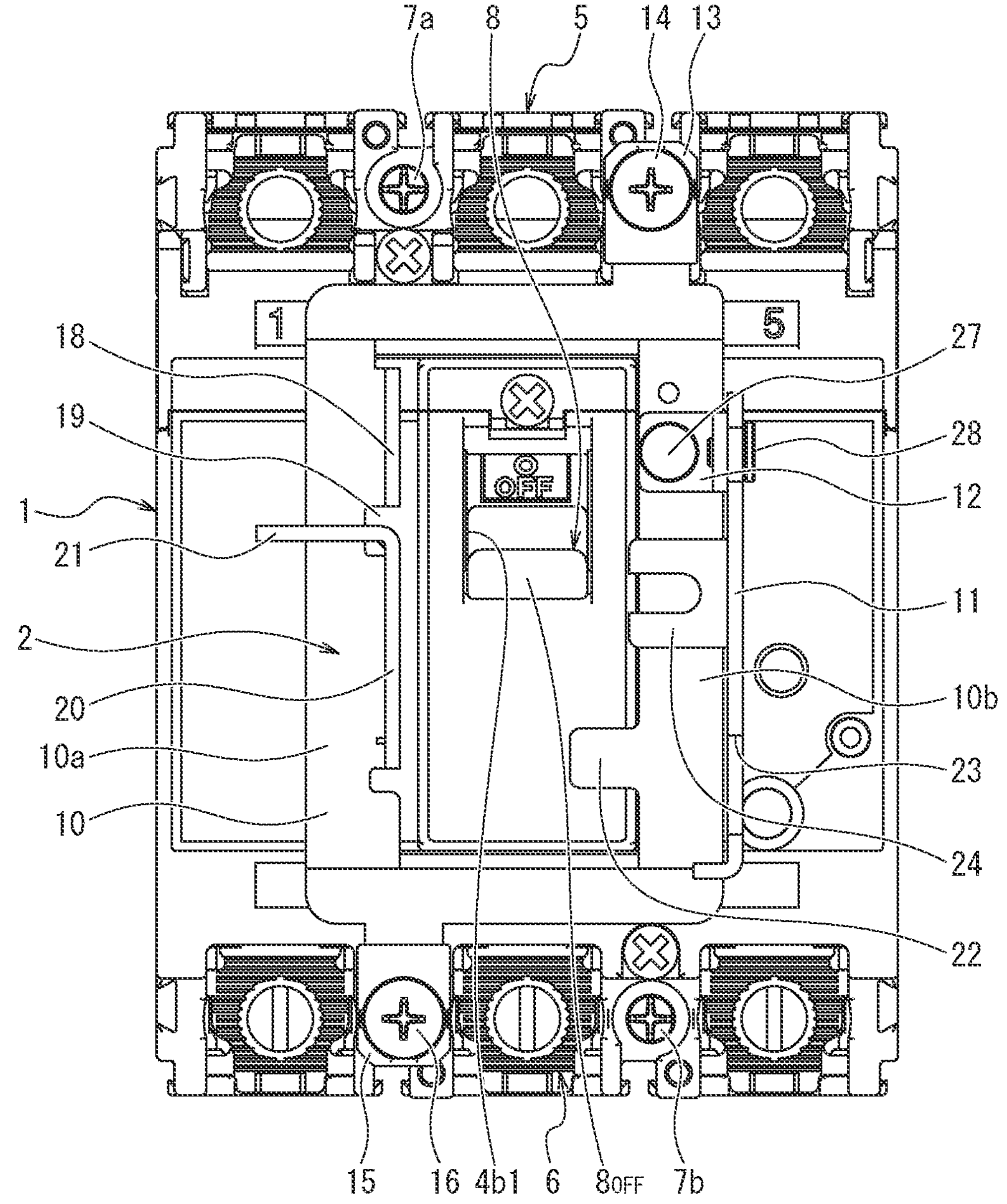
FIG. 3 is a plan view illustrating a state where the handle lock device according to the present disclosure is attached in a proper position on the circuit breaker.
Figure 4:
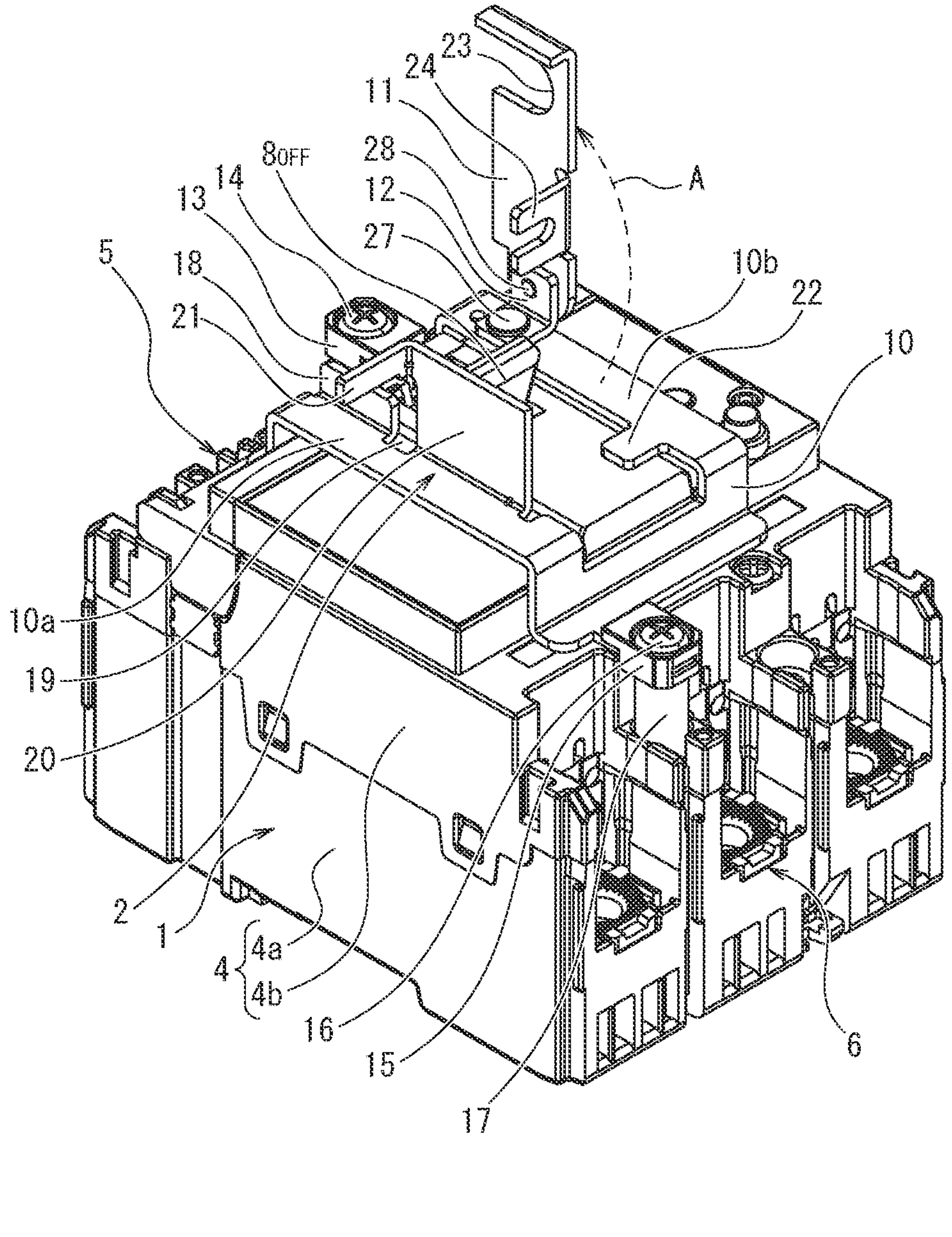
FIG. 4 is a perspective view illustrating a state where a handle lock plate forming the handle lock device is raised within an upper surface range of a cover.

FIG. 1 is a plan view illustrating a circuit breaker 1 of an embodiment. FIG. 2 is a perspective view illustrating a handle lock device 2 of an embodiment. FIG. 3 is a plan view illustrating a state where the handle lock device 2 is attached to the circuit breaker 1. FIG. 4 is a perspective view in which the handle lock device 2 is attached to the circuit breaker 1.

As illustrated in FIGS. 1 and 4, the circuit breaker 1 includes a main body case 4 composed of a box-shaped base 4*a* and a cover 4*b*, and a power supply-side terminal portion 5 and a load-side terminal portion 6 having three poles are formed on both sides of the main body case 4. The base 4*a* and the cover 4*b* are integrated with each other by attaching screws indicated by reference sign 31. Fixing screws 7*a* and 7*b* provided between electrodes of the power supply-side terminal portion 5 and the load-side terminal portion 6 and penetrating through a partition wall secure the circuit breaker 1 into an inside of a switchboard. Additionally, an opening portion 4*b*1 is formed on an upper surface of the cover 4*b* of the main body case 4, and a knob portion $\mathbf{8}_{OFF}$ of a rocker type handle 8 for operating a toggle link mechanism (an open/close mechanism) arranged inside the main body case 4 protrudes upward from the opening portion 4*b*1. Here, reference sign $\mathbf{8}_{OFF}$ indicates a position to which the knob portion has moved so that a main circuit contact of the circuit breaker 1 is open (an OFF position of the handle 8). In addition, reference sign $\mathbf{8}_{ON}$, which will be described later, indicates a position to which the knob portion has moved so that the main circuit contact is closed (an ON position of the handle 8).

In FIG. 1, on a part of the cover 4*b* located on the right side of the fixing screw 7*a* is formed a power supply-side engagement portion 9*a* with which a power supply-side attaching screw 14 of the handle lock device 2, which will be described later, engages, and on a part of the cover 4*b* located on the left side of the fixing screw 7*b* is formed a load-side engagement portion 9*b* with which a load-side attaching screw 16 of the handle lock device 2 engages. The power supply-side engagement portion 9*a* and the load-side engagement portion 9*b* are blind holes where female screws formed thereinside are closed with a resinous lid.

As illustrated in FIG. 2, the handle lock device 2 includes a lock base 10 formed of a metal plate material, a handle lock plate 11, and a plate rotating member 12.

The lock base 10 includes a pair of first frames 10*a* and 10*b* extending in parallel to each other and a pair of second frames 10*c* and 10*d* bent in the same direction from both ends of the pair of first frames 10*a* and 10*b* and connecting the first frames 10*a* and 10*b* to each other, and is provided with a rectangular-shaped opening portion 10*e* surrounded by the pair of first frames 10*a* and 10*b* and the pair of second frames 10*c* and 10*d*. The one second frame 10*c* includes a power supply-side connection portion 13 provided with a through hole, a power supply-side attaching screw 14 whose head portion is engaged with the power supply-side connection portion 13 and which is inserted into the through hole, and a spacer (not illustrated) which is continuous to a lower part of the power supply-side connection portion 13 and through which an upper part of a screwed portion of the power supply-side attaching screw 14 is inserted. Additionally, the other second frame 10*d* includes a load-side connection portion 15 provided with a through hole, a load-side attaching screw 16 whose head portion is engaged with the load-side connection portion 15 and which is inserted through the through hole, and a spacer 17 which is continuous to a lower part of the load-side connection portion 15 and through which an upper part of a screwed portion of the load-side attaching screw 16 is inserted.

On the one first frame 10*a* of the lock base 10, a first plate 18 stands up in a position closer to the power supply-side connection portion 13 at an edge thereof on the opening portion 10*e* side, and a second plate 20 stands up in a position closer to the load-side connection portion 15 with a slit 19 provided between the first plate 18 and the second plate 20. An upper part of an end portion of the second plate 20 on the first plate 18 side is provided with a first lock hole division portion 21 that is bent at a right angle from the second plate 20 in a direction away from the opening portion 10*e* and that extends in a bar shape. Additionally, on the other first frame 10*b* of the lock base 10 is formed an incorrect attachment prevention protrusion 22 protruding toward the opening portion 10*e*.

The handle lock plate 11 is an elongated member, where a second lock hole division portion 23 formed by cutting into a U shape is formed on a longitudinal one end side thereof, and an OFF position confirmation portion 24 is formed that extends orthogonally from an edge of a longitudinal center part thereof.

The plate rotating member 12 is a member that includes a first rotating member 25 and a second rotating member 26 by bending a flat plate member into an L shape. The first rotating member 25 is rotatably arranged on the other first frame 10*b* by contacting an upper surface of the other first frame 10*b* on the power supply-side connection portion 13 side and being connected to a first rotary shaft 27 with an axial center extending in a vertical direction in FIG. 2. Additionally, the second rotating member 26 rotatably supports the handle lock plate 11 by contacting an other end side surface of the handle lock plate 11 arranged so that the OFF position confirmation portion 24 faces the opening portion 10*e* side and the second lock hole division portion 23 opens on an upper side of FIG. 2 and being connected to a second rotary shaft 28 with an axial center orthogonal to the first rotary shaft 27.

Next, FIG. 3 illustrates a state where the handle lock device 2 having the above configuration is attached in a proper position on the circuit breaker 1.

The power supply-side attaching screw 14 of the power supply-side connection portion 13 of the handle lock device 2 is screwed into the female screw of the power supply-side engagement portion 9*a* of the circuit breaker 1 arranged inside the switchboard, and the load-side attaching screw 16 of the load-side connection portion 15 is screwed into the female screw of the load-side engagement portion 9*b* of the circuit breaker 1 to attach the handle lock device 2 in the proper position on the circuit breaker 1.

Next, a procedure for applying padlocks 3 and 3S to the handle lock device 2 attached to the circuit breaker 1 to lock the knob portion $\mathbf{8}_{OFF}$ of the handle 8 into the OFF position is described with reference to FIGS. 4 to 9.

Figure 5:
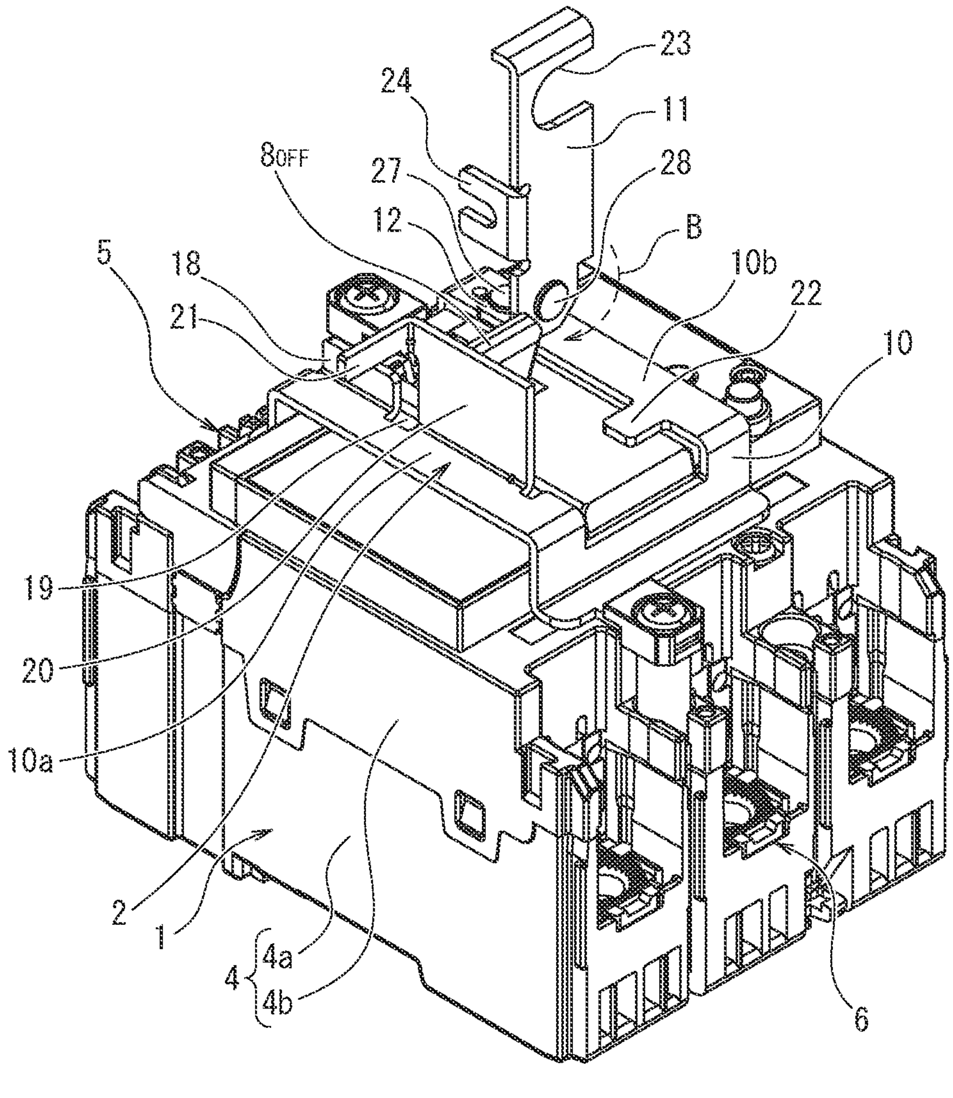
FIG. 5 is a perspective view illustrating a state where the handle lock plate is rotated within the upper surface range of the cover.
Figure 6:
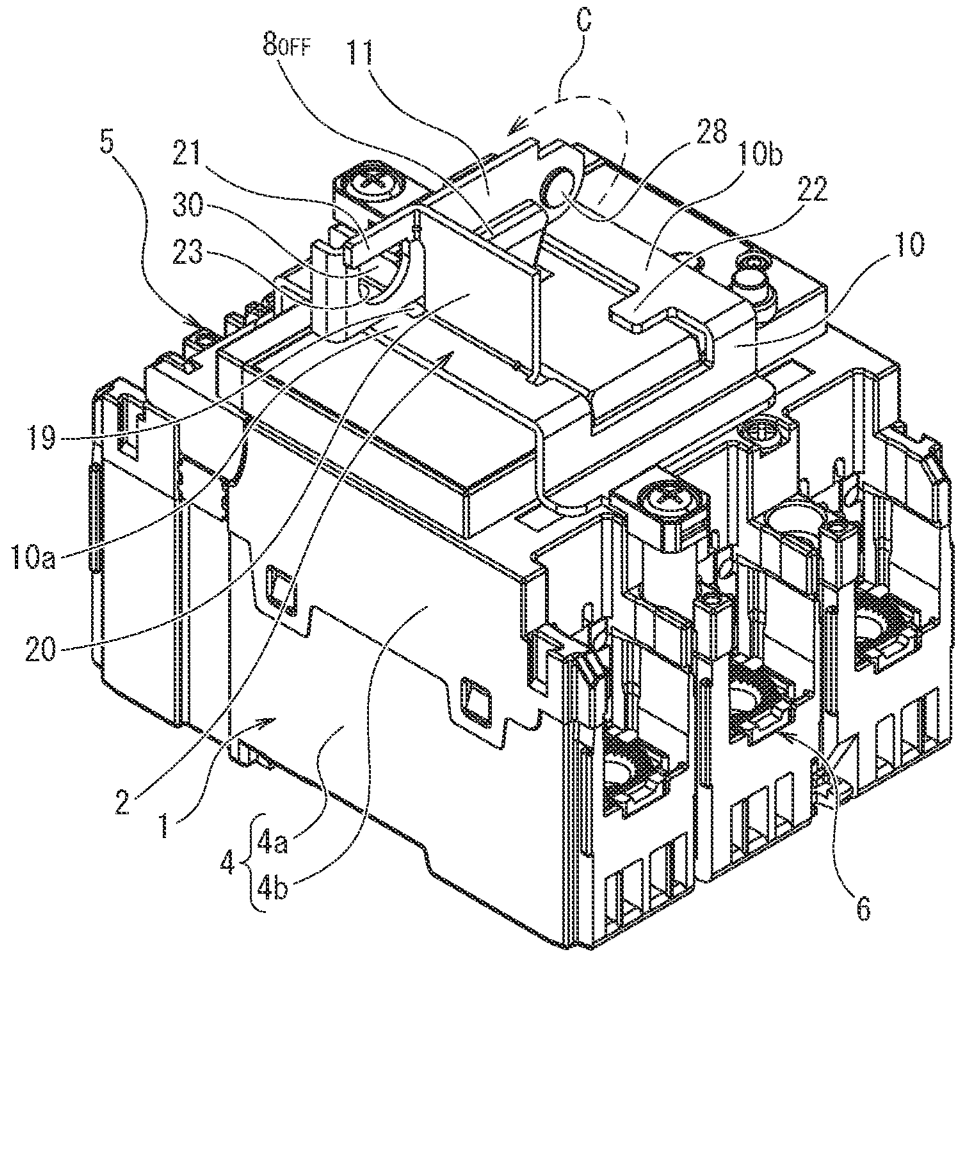
FIG. 6 is a perspective view illustrating a state where the handle lock plate is rotated across a knob portion of a handle protruding from the cover.

First, as illustrated in FIG. 4, the handle lock plate 11 is rotated at 90 degrees around the second rotary shaft 28 (operation A indicated by a dashed arrow in FIG. 4) to raise the handle lock plate 11 from the other first frame 10*b* of the lock base 10. Then, as illustrated in FIG. 5, the plate rotating member 12 is rotated at 90 degrees around the first rotary shaft 27 (operation B indicated by a dashed arrow in FIG. 5) to cause the OFF position confirmation portion 24 of the raised handle lock plate 11 to face the opening portion 4*b*1 side of the cover 4*b*. Next, the handle lock plate 11 is rotated at 90 degrees around the second rotary shaft 28 (operation C indicated by a dashed arrow in FIG. 6), and a leading end side of the handle lock plate 11 is inserted into the slit 19. Thus, the operations of the handle lock plate 11 illustrated in FIGS. 4 to 6 are performed in such a manner so as not to extend beyond a range of the upper surface of the cover 4*b* of the main body case 4.

Here, when the knob portion of the handle 8 is in the ON position, the OFF position confirmation portion 24 of the handle lock plate 11 interferes with the knob portion $\mathbf{8}_{ON}$, and therefore the leading end side of the handle lock plate 11 cannot be inserted into the slit 19, so that the knob portion Box of the handle 8 can be confirmed to be in the ON position. As illustrated in FIG. 6, when the knob portion $\mathbf{8}_{OFF}$ of the handle 8 is in the OFF position and the leading end side of the handle lock plate 11 is inserted into the slit 19, the handle lock plate 11 is positioned across the opening portion 4*b*1 of the cover 4*b*. Then, as illustrated in FIG. 6, the second lock hole division portion 23 approaches the first lock hole division portion 21, and the linear first lock hole division portion 21 closes the U-shaped opening side of the second lock hole division portion 23 to form a substantially semicircular lock hole 30.

Figure 7:
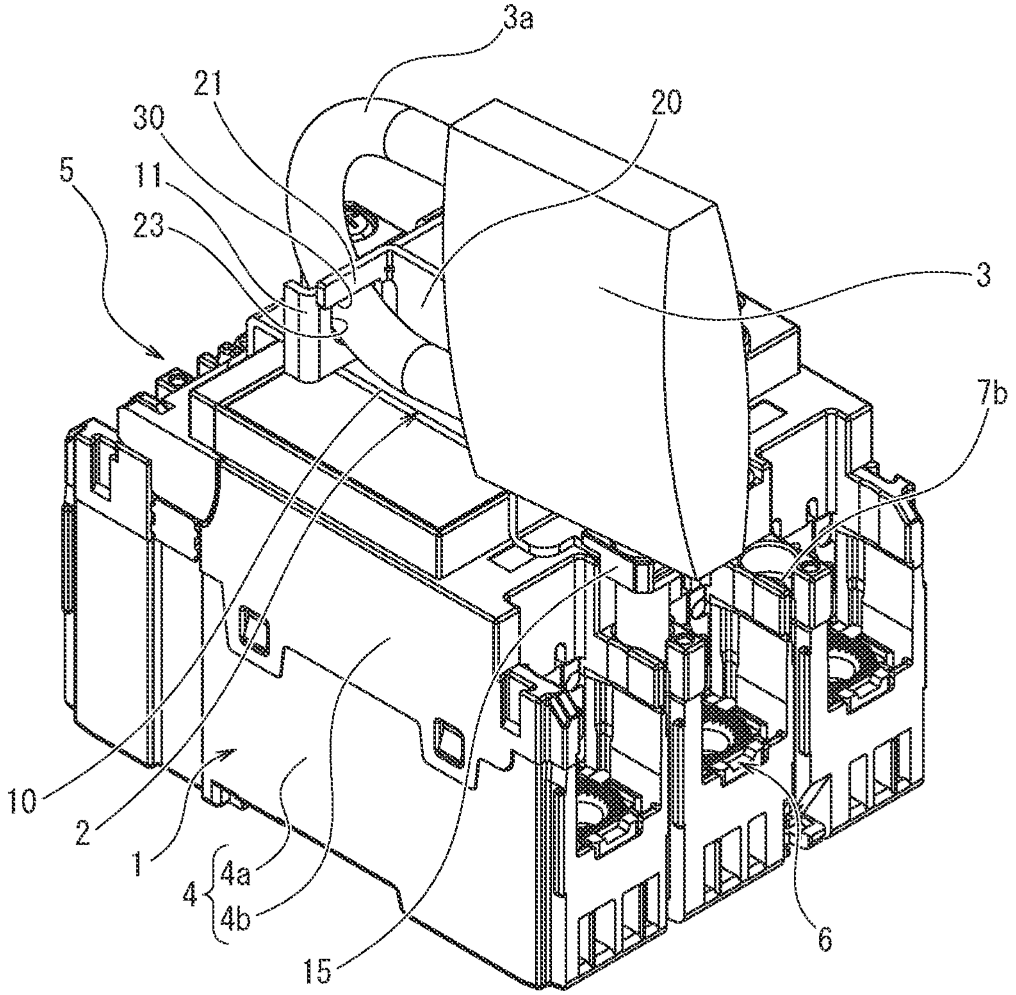
FIG. 7 is a perspective view illustrating a state where a padlock is applied to a lock hole formed by rotating the handle lock plate to lock the knob portion into an OFF position.
Figure 8:
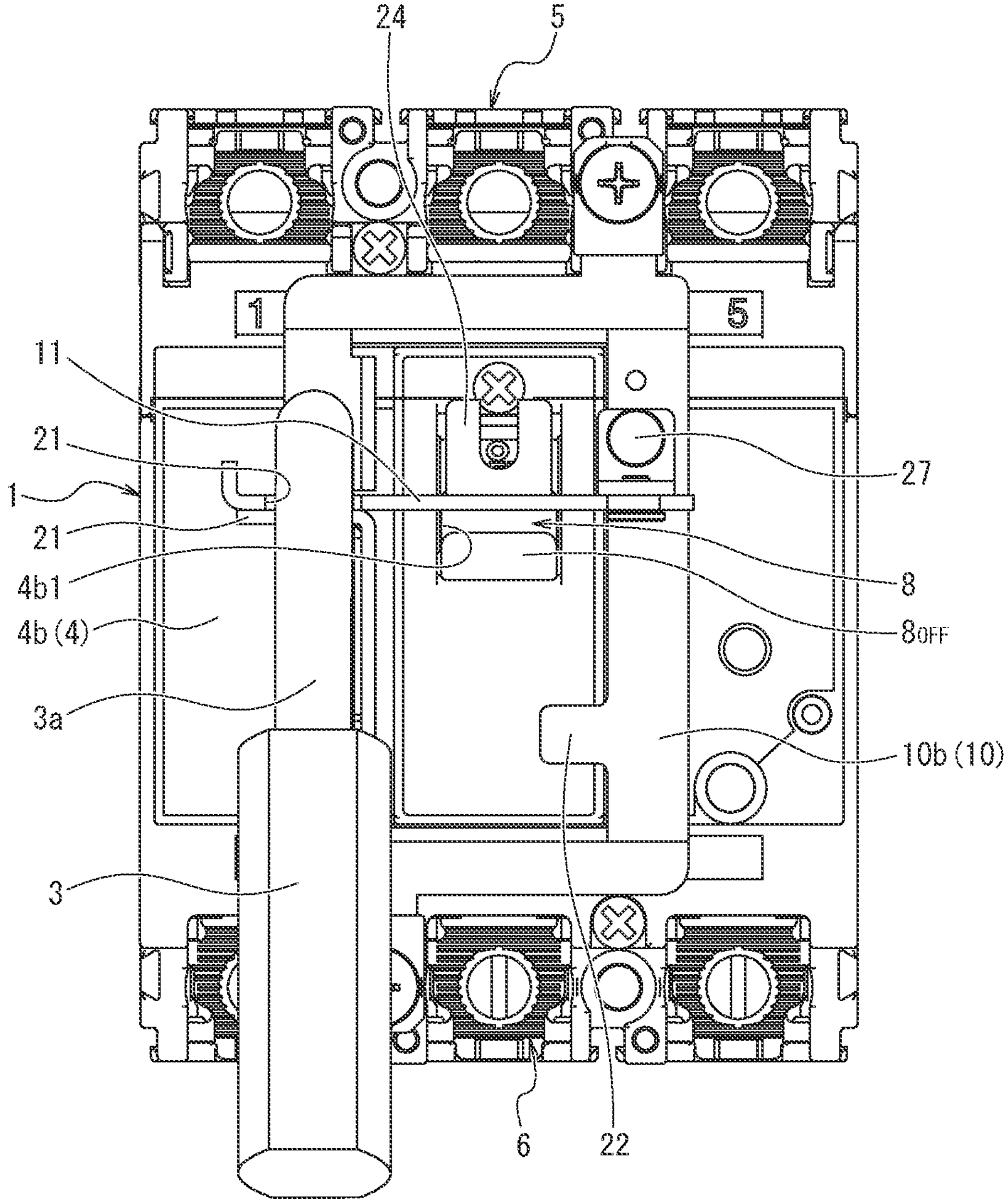
FIG. 8 is a plan view illustrating a state where the padlock is applied to the lock hole to lock the knob portion into the OFF position.

Next, as illustrated in FIG. 7, a shackle 3*a* of the padlock 3 is inserted through the lock hole 30 formed by the second lock hole division portion 23 and the first lock hole division portion 21 to lock the padlock 3. As illustrated in FIG. 8, the handle lock plate 11 positioned across the opening portion 4*b*1 restrains the knob portion $\mathbf{8}_{OFF}$ of the handle 8 from moving upward (moving to the ON position of the handle 8).

Figure 9:
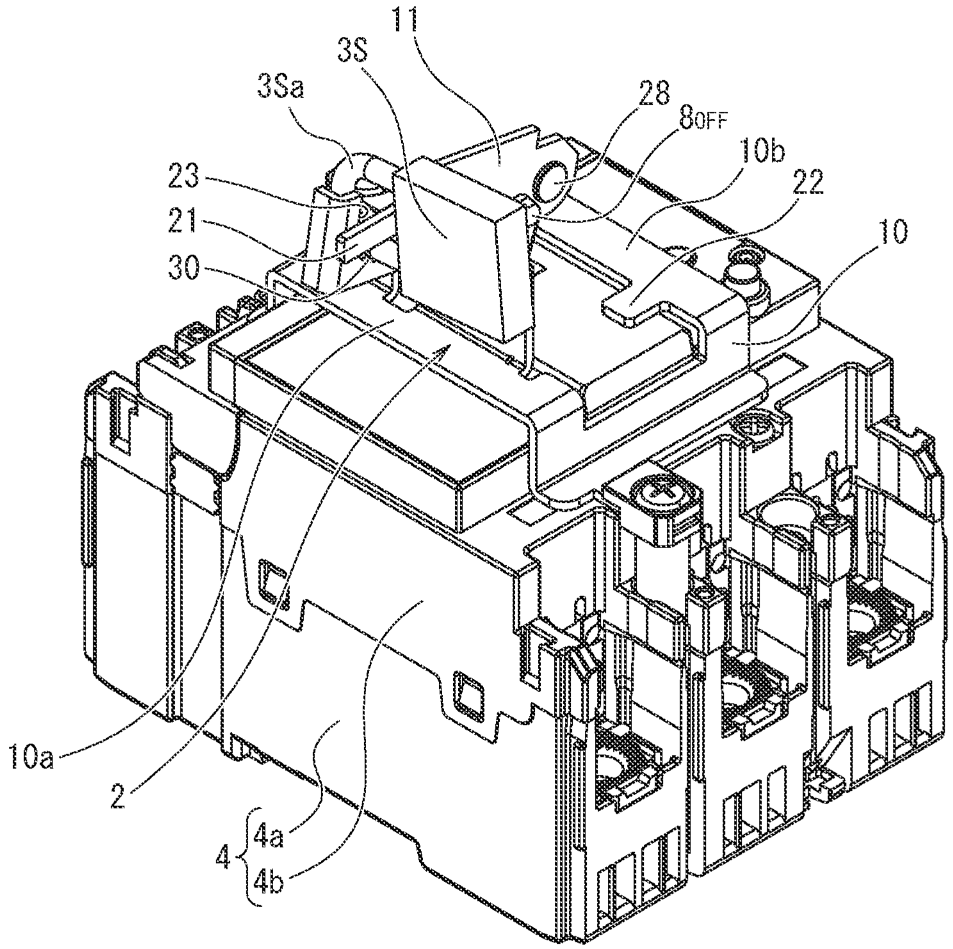
FIG. 9 is a perspective view illustrating a state where a padlock smaller in size than the padlock illustrated in FIGS. 7 and 8 is applied to the lock hole to lock the knob portion into the OFF position.

Here, FIG. 9 illustrates a state where the small-sized padlock 3S with a shackle 3Sa smaller in diameter than the shackle 3*a* of the padlock 3 is applied to the lock hole 30. In this case, since the shackle 3Sa having a small diameter passes therethrough, the handle lock plate 11 rotates around the second rotary shaft 28 to reduce the diameter of the lock hole 30. However, the handle lock plate 11 is retained across the opening portion 4*b*1, and restrains the knob portion $\mathbf{8}_{OFF}$ of the handle 8 from moving upward in FIG. 8 (moving to the ON position of the handle 8).

Thus, in the handle lock device 2 of the present embodiment, the handle lock plate 11 is positioned across the opening portion 4*b*1 and restrains the knob portion $\mathbf{8}_{OFF}$ of the handle 8 in the OFF position when the knob portion $\mathbf{8}_{OFF}$ of the handle 8 is in the OFF position. Then, the first lock hole division portion 21 formed at the second plate 20 of the lock base 10 and the second lock hole division portion 23 of the handle lock plate 11 form the lock hole 30. Accordingly, only when the handle lock plate 11 restrains the knob portion $\mathbf{8}_{OFF}$ of the handle 8 in the OFF position, the padlock 3 can be applied to the lock hole 30, therefore enabling enhanced work safety.

In addition, when using the small-sized padlock 3S with the shackle 3Sa small in diameter instead of the padlock 3 with the shackle 3*a* large in diameter, the handle lock plate 11 rotates around the second rotary shaft 28, but can cross the opening portion 4*b*1 and restrain the knob portion $\mathbf{8}_{OFF}$ Of the handle 8 in the OFF position, and also the small-sized padlock 3S can be applied to the lock hole 30. Thus, even with the use of the small-sized padlock 3S, work safety can be sufficiently enhanced.

Furthermore, the operation of rotating the handle lock plate 11 of the handle lock device 2 around the second rotary shaft 28 to stand it up and the operation of rotating the handle lock plate 11 around the first rotary shaft 27 to change the standing direction are performed in such a manner so as not to extend beyond the range of the upper surface of the cover 4*b* of the main body case 4. Thus, when a plurality of the circuit breakers 1 is arranged in rows on rails of a switchboard and the handle lock device 2 is attached to each circuit breaker 1, the padlock 3 can be applied to the lock hole 30 by operating the handle lock plate 11 of its own without affecting the operations of the adjacent one or more circuit breakers 1.

Figure 10:
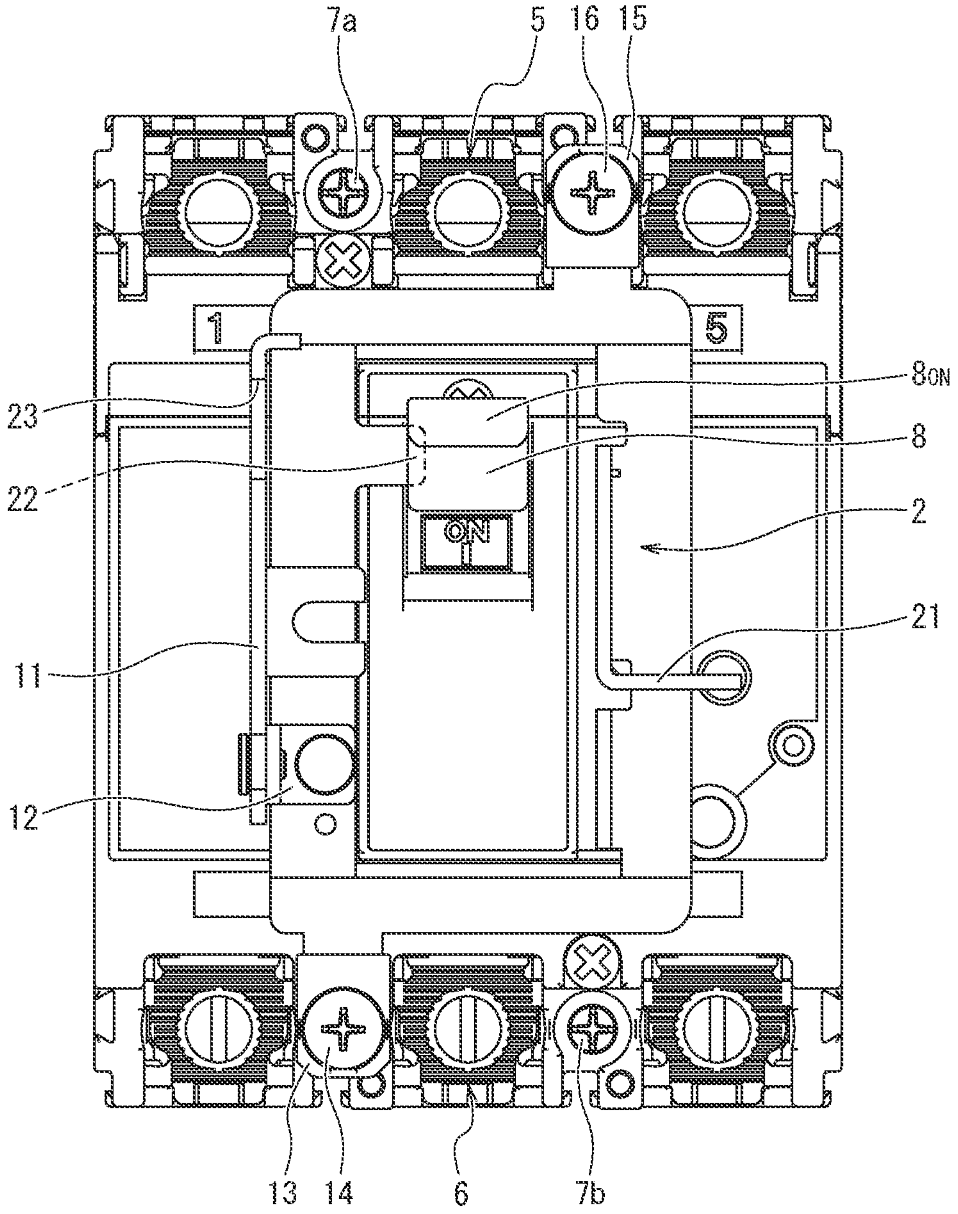
FIG. 10 is a diagram illustrating a state where the handle lock device according to the present disclosure is about to be attached in an incorrect position on the circuit breaker.

Here, FIG. 10 is a diagram illustrating a state where the handle lock device 2 of the present embodiment is about to be incorrectly attached to the circuit breaker 1 where the knob portion Box of the handle 8 is in the ON position. Specifically, the handle lock device 2 is about to be incorrectly attached by engaging the load-side attaching screw 16 of the load-side connection portion 15 in the power supply-side engagement portion 9*a* (see FIG. 1) of the circuit breaker 1 and engaging the power supply-side attaching screw 14 of the power supply-side connection portion 13 in the load-side engagement portion 9*b* (see FIG. 1) of the circuit breaker 1.

When incorrectly attaching the handle lock device 2 to the circuit breaker 1 as above, the incorrect attachment prevention protrusion 22 protruding from the other first frame 10*b* of the lock base 10 is positioned across the opening portion 4*b*1 of the cover 4*b* and interferes with the knob portion Box of the handle 8 in the ON position, so that the handle lock device 2 cannot be attached to the circuit breaker 1.

Accordingly, even when the handle lock device 2 of the present embodiment is about to be incorrectly attached to the circuit breaker 1, the incorrect attachment prevention protrusion 22 interferes with the knob portion Box of the handle 8 in the ON position, thus enabling prevention of the incorrect attachment of the handle lock device 2.

In addition, when the handle lock device 2 of the present embodiment is incorrectly attached to the circuit breaker 1 where the knob portion of the handle 8 is in the OFF position (knob portion $\mathbf{8}_{OFF}$), the incorrect attachment prevention protrusion 22 is positioned across the opening portion 4*b*1 of the cover 4*b* and restrains the knob portion of the handle 8 from moving to the ON position (knob portion $\mathbf{8}_{ON}$), thus indicating that the handle lock device 2 is incorrectly attached.

REFERENCE SIGNS LIST

1: Circuit breaker
2: Handle lock device
3: Padlock
3*a*: Shackle
3S: Small-sized padlock
3Sa: Shackle
4: Main body case
4*a*: Base
4*b*: Cover (case)
4*b*1: Opening portion
5: Power supply-side terminal portion
6: Load-side terminal portion
7*a*, 7*b*: Fixing screw
8: Handle
$\mathbf{8}_{OFF}$: Knob portion
9*a*: Power supply-side engagement portion
9*b*: Load-side engagement portion
10: Lock base
11: Handle lock plate
12: Plate rotating member

The invention claimed is:

1. A handle lock device for a circuit breaker, the handle lock device being configured to lock a knob portion of a rocker type open/close operation handle protruding from an upper surface of a case of the circuit breaker into an OFF position, the handle lock device comprising:

a lock base attachable to the upper surface of the case, the lock base including a first divided portion of a lock hole as a first lock hole division portion at a part of the lock base; and a handle lock plate rotatably connected to the lock base, the handle lock plate including a second divided portion of the lock hole as a second lock hole division portion at a part of the handle lock plate, wherein the handle lock plate is rotatable to a position to restrain the knob portion in the OFF position, such that the second lock hole division portion of the handle lock plate moves to a position continuous with the first lock hole division portion of the lock base to form the lock hole based on the first divided portion and the second divided portion of the lock hole, and a padlock is appliable to the lock hole to cause the handle lock plate to restrain the knob portion in the OFF position.

2. The handle lock device for a circuit breaker according to claim 1, wherein the first lock hole division portion is a bar-shaped portion provided in the lock base, and the second lock hole division portion is a cut U shape in the handle lock plate, such that when the handle lock plate is at the OFF position, the bar-shaped portion of the first lock hole division portion closes an opening side of the cut U shape of the second lock hole division portion to form the lock hole.

3. The handle lock device for a circuit breaker according to claim 1, wherein the handle lock plate includes an OFF position confirmation portion configured to confirm that the knob portion is in the OFF position.

4. The handle lock device for a circuit breaker according to claim 1, wherein the handle lock plate includes an OFF position confirmation portion configured to confirm that the knob portion is in the OFF position.

5. The handle lock device for a circuit breaker according to claim 1, wherein a base end of the handle lock plate is connected to the lock base via a rotating member, and the second lock hole division portion is formed at a leading end of the handle lock plate, the rotating member including a first rotary shaft with an axial center extending in a direction orthogonal to the upper surface of the case and a second rotary shaft with an axial center extending in a direction along the upper surface of the case, such that the handle lock plate is rotatable around the first rotary shaft and the second rotary shaft of the rotating member to rotate to the position that restrains the knob portion in the OFF position.

6. The handle lock device for a circuit breaker according to claim 5, wherein the first lock hole division portion is a bar-shaped portion provided in the lock base, and the second lock hole division portion is a cut U shape in the handle lock plate, such that when the handle lock plate is at the OFF position, the bar-shaped portion of the first lock hole division portion closes an opening side of the cut U shape of the second lock hole division portion to form the lock hole.

7. The handle lock device for a circuit breaker according to claim 5, wherein the handle lock plate includes an OFF position confirmation portion configured to confirm that the knob portion is in the OFF position.

* * * * *